July 3, 1928.  1,675,332
H. J. J. M. DE R. DE BELLESCIZE
DIRECTION FINDER
Filed Aug. 29, 1921   3 Sheets-Sheet 1

Inventor
H.J.J.M.DeR. DeBELLESCIZE
By his Attorney

July 3, 1928.
H. J. J. M. DE R. DE BELLESCIZE
1,675,332
DIRECTION FINDER
Filed Aug. 29, 1921    3 Sheets-Sheet 2
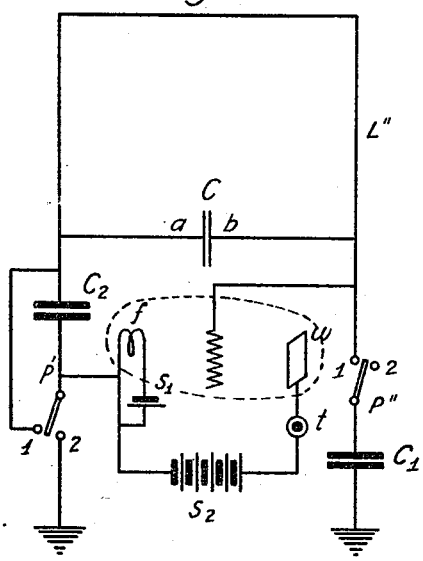
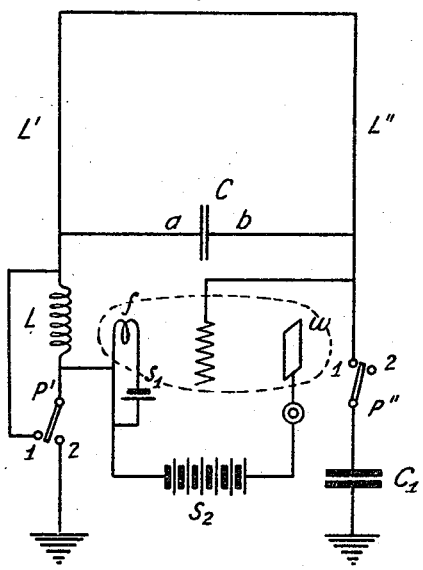
Inventor
H.J.J.M. De R. De BELLESCIZE
By his Attorney Patented July 3, 1928.

1,675,332

UNITED STATES PATENT OFFICE.

HENRI JEAN JOSEPH MARIE DE REGNAULD DE BELLESCIZE, OF TOULON, FRANCE.

DIRECTION FINDER.

Application filed August 29, 1921, Serial No. 496,537, and in France May 11, 1920.

(GRANTED UNDER THE PROVISIONS OF THE ACT OF MARCH 3, 1921, 41 STAT. L., 1313.)

The invention relates to a method of eliminating the 180 degree doubt in the radio-goniometrical determination of the direction of a sending station and also to the specific means by which efficient use may be made of this method.

According to the present invention, a receiving frame or loop antenna is used and may be balanced from an electrostatical standpoint for the purpose and in the manner particularly described in French Patent, No. 495,316 and its additions.

According to the present invention, two successive observations to determine the point of minimum response are made, the first one with a balanced frame and the second with an unbalanced frame. This is done for the purpose of determining whether the first observation is correct or whether it is to be corrected by 180°. The direction of the angle of digression between the plane of the loop when the second observation is made and the plane of the loop when the first observation is made is utilized in this determination. In the following, the arrangements will be described for obtaining invariable harmony between the direction of the angular digression and the 180 degree correction and also for securing a sufficient angular digression to permit the application of the method with certainty. Furthermore, the steps will be described which must be borne in mind when practicing the invention for the purpose of establishing and using the graduation of the apparatus.

In the drawings:—

Figure 3B:
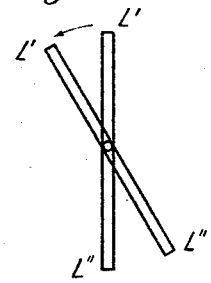
Figure 3A:
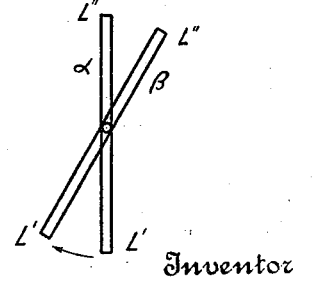

Figs. 3$^a$ and 3$^b$ are diagrams used in explaining the operation of the device.

Figure 1:
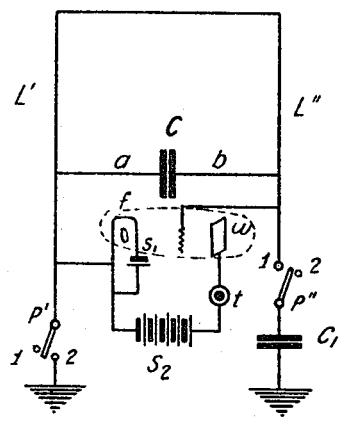
Fig. 1 shows the connections of the frame to the detecting and inducting apparatus.
Figure 6:
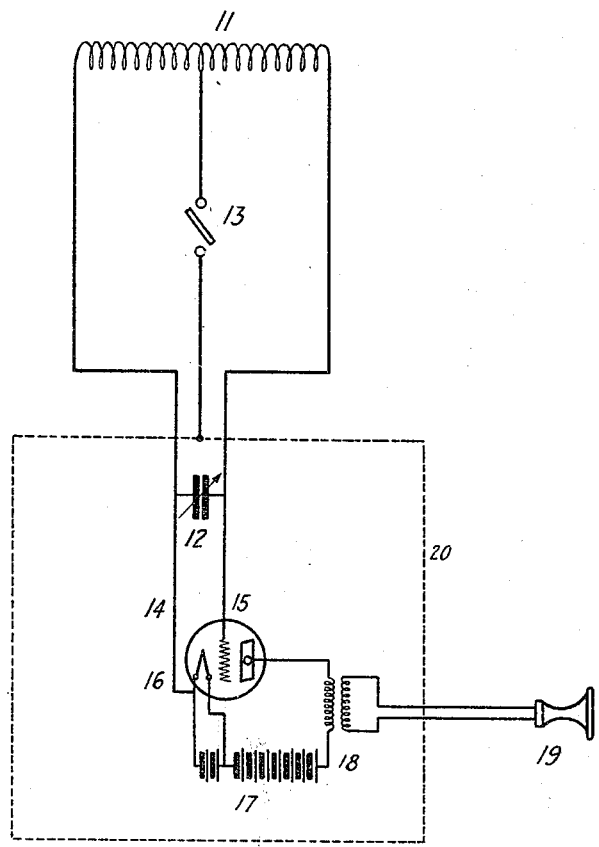

Figs. 4, 5, and 6 are modifications of the device as shown in Fig. 1.

Two circuits are superposed on the receiving frame which directly or indirectly actuates the detecting and indicating system:

One is the normally closed circuit which is traversed by a current that does not modify the total charge of the apparatus.

The other is an open circuit which is traversed by the current circulating between the mass and the ground.

The open circuit will have zero effect on the telephone or other detector of the direction finder, if the frame is balanced, e. g. (Fig. 1) by opening the switch $P'$ and providing between the terminal $b$ of the main condenser C and the ground a small additional condenser $C'$ to artificially reproduce the capacities individual to the detecting and indicating apparatus connected with the terminal $a$ and schematically represented by the elements of a three electrode tube connected to this terminal, i. e. the filament $f$ and the heating battery $S_1$, the plate battery $S_2$, the telephone $t$, and the plate $u$. When the frame is balanced, the electromotive force generated by the variation of flux through the closed circuit is the only one that is effective on the grid of the three-electrode tube. This will assume the form of $$X \sin Z \sin(\omega t + \epsilon)$$

The amplitude X depends on the total surface of the frame, Z is the angle formed by the plane of the turns with the magnetic field, $\omega$ is a phase product of the angular frequency $\omega$ and the time $t$, $\epsilon$ is a phase depending on the time chosen as origin and the precision with which the receiver is tuned.

Figure 2:
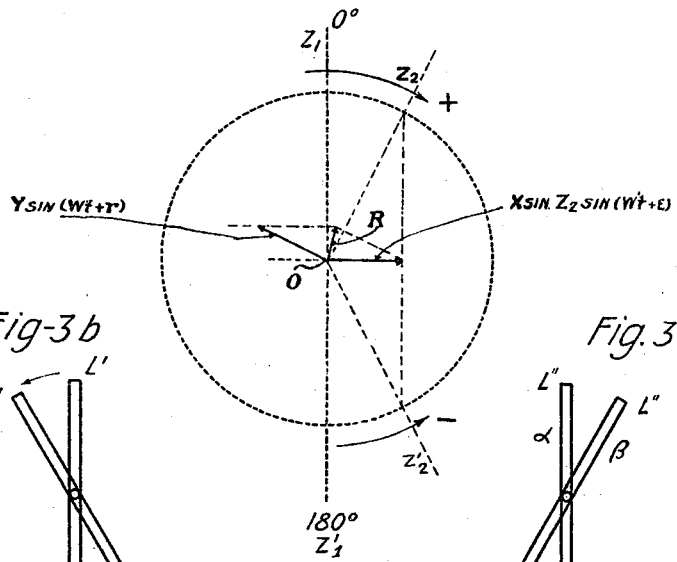
Fig. 2 is a graphical illustration showing the characteristics of the antenna when unbalanced.

The action of signals on the detector-indicator system is thus annulled by two values of $Z$; $Z_1 = 0$ and $Z'_1 = 180$ (Fig. 2). The position of the sending station will therefore be known to be in either of two directions at angles of 180 degrees.

If the frame is unbalanced, e. g. (Fig. 1) by closing the switch $P'$ to connect terminal $a$ of condenser C to ground and opening the switch $P''$, as a result of the unsymmetry of the ground connection, an additional force $$Y \sin(\omega t + r)$$

is superposed on the normal effect of $X \sin Z \sin(\omega t + \epsilon)$; whereby the total effect on the indicator will assume the following form:

$$X \sin Z \sin(\omega t + \epsilon) + Y \sin(\omega t + \psi).$$

The graphical illustration in Fig. 2 shows the characteristics of the antenna when unbalanced. The diametrical line in such figure is assumed to be at right angles to the direction of propagation of the incoming signals so that the lines $OZ_1$ and $OZ'_1$ indicate the positions of the frame coil of the antenna when it is at angles of 0° and 180° respectively with the plane of the magnetic field. The other broken lines extending radially from the center O of the circle indicate positions of the frame coil at angles $Z_2$ and $Z'_2$ respectively with the magnetic field. In each of the last named positions of the frame coil, the electromotive force induced in the loop of the antenna by the magnetic field is indicated by the line $X \sin Z_2 \sin (\omega t + \epsilon)$, it being assumed that the signal is coming from the right of the figure, and the voltage due to the antenna effect of the frame coil in its unbalanced condition is indicated by the line $Y \sin (\omega t + \gamma)$. The force $Y \sin (\omega t + \gamma)$ is generally not annulled but makes with the force $X \sin Z_2 (\omega t + \epsilon)$ a resultant R which passes through a minimum for a certain small value of the angles $Z_2$ and $Z'_2$ at which the electromotive forces $Y \sin (\omega t + \gamma)$ and $X \sin Z_2 \sin (\omega t + \epsilon)$ are equal. The angles $Z_2$ and $Z'_2$ are equal, one of them being calculated positively beginning with 0°, Fig. 2, and the other negatively beginning with 180° or $Z'_1$.

The electromotive force $X \sin Z_2 (\omega t + \epsilon)$ is constant in phase upon rotation of the frame coil as indicated by either of the arrows on Fig. 2, but varies in magnitude according to the angle of the frame coil with the plane of the magnetic field. The electromotive force $Y \sin (\omega t + \gamma)$, on the other hand, is constant both in phase and magnitude regardless of the position of the frame coil. Accordingly, when the frame coil is rotated the magnitude of the resultant R of the electromotive forces $X \sin Z_2 \sin (\omega t + \epsilon)$ and $Y \sin (\omega t + \gamma)$ passes through a minimum value at positions of the frame coil depending solely on the magnitude of the electromotive force $X \sin Z_2 \sin (\omega t + \epsilon)$. It will further be understood from Fig. 2 that the magnitude of the resultant R at its minimum value depends upon the angle $a$ which indicates the phase of the antenna effect voltage $Y \sin (\omega t + \gamma)$.

If the frame coil is rotated from the position $Z_1$ or $Z'_1$ in a direction opposite to the directions indicated by the arrows in Fig. 2, the phase of the electromotive force $X \sin Z_2 \sin (\omega t + \epsilon)$ will be opposite to that indicated by the vector in Fig. 2. The resultant R, therefore, of the voltage induced in the loop of the antenna by the magnetic field and the antenna effect voltage will continuously increase as the loop is turned from the position $Z_1$ or $Z'_1$ and will be much larger than when the loop is rotated to one of the positions indicated on the vector diagram.

This property is to be utilized for removing the doubt of 180 degrees that exists concerning the direction of the signalling station. Therefore, it is necessary that:

(a) The direction in which the frame rotates when passing from the position of minimum response with the balanced circuit arrangement to the corresponding position with the unbalanced circuit arrangement follow an invariable and known law.

(b) The difference $(Z_2 - Z_1)$ have a sufficiently great absolute value to avoid errors in observation.

(c) The direction of rotation given to the frame in passing from the position of minimum signal with balance to the position of minimum response without balance must be ascertainable by a simple rule to determine whether the first reading was correct or erroneous by 180 degrees.

The following conditions should be realized for insuring that the direction in which the frame rotates when passing from the position of minimum response with balance to the position of minimum response without balance follow an invariable law.

It is necessary and it is sufficient that the respective waves $\lambda_1$; $\lambda_2$ corresponding to the tuning of the closed resonator and the open resonator maintain, one as well as the other, a well defined relation with regard to the wave $\lambda$ that is to be received.

The closed resonator should be tuned to the signal and this will at least be approximately the case. With respect to the open system, its own wave $\lambda_2$ may, for example, be inferior to $\lambda$. The inequality $\lambda_2 < \lambda$ may always be easily produced. It may be brought about, if necessary, by providing (Fig. 4) a condenser $C_2$ in the ground connection to unbalance the apparatus.

The double condition ($\lambda_1 = \lambda$ and the adjustment $\lambda_2 < \lambda$ produced in turn by the construction of the aparatus) will insure that the direction of the rotation will follow a definite law which may be made use of to remove the doubt of 180 degrees.

If the tuning of the open circuit is changed, the phase of the antenna effect voltage $Y \sin (\omega t + \gamma)$, as indicated by the angle $a$ in Fig. 2, is varied. If, for example, the open circuit is tuned to a wave length $\lambda_2$, which is equal to the wave length $\lambda$ to be received, the phase of the antenna effect voltage $Y \sin (\omega t + \gamma)$ is at 180° from the vector $X \sin Z_2 \sin (\omega t + \epsilon)$. It will also be apparent from Fig. 2 that if the tuning of the open circuit of the antenna is varied from a wave length corresponding to the phase angle $a$ to a wave length more nearly approaching the wave length $\lambda$ to which the closed circuit of the antenna is tuned, the angle $a$ of the antenna effect voltage will be decreased, thereby causing the minimum resultant R of the electromotive forces in the closed circuit and the open circuit of the antenna to be varied both in magnitude and phase. Moreover, it will also be understood from Fig. 2 that if the tuning of the open circuit of the antenna is changed so that the wave length $\lambda_2$ of the open circuit is reversed with relation to the wave $\lambda$ to be received, that is, if it is changed from a value less than $\lambda$ to a value greater than λ or vice versa, the position of the line Y sin $(\omega t+\gamma)$ will be changed to the opposite side of the 180° angle to the vector X sin $Z_2$ sin $(\omega t+\epsilon)$, so that the resultant R of the electromotive forces in the frame coil of the antenna will be caused to occupy a position at the opposite side of the vector X sin $Z_2$ sin $(\omega t+\epsilon)$. It is important, however, as will appear more clearly hereinafter, that, in order that readings may be reliably and readily taken, the minimum resultant R shall be as constant as practicable both in phase and magnitude. Consequently, as indicated above, the wave length to which the open circuit of the antenna is tuned should bear a substantially constant relation with the wave length which is being received.

In order to establish the rules necessary for the practical use, it is indispensable that the law in question be known. First of all, it is apparent (Fig. 3ª) that when passing from one position α corresponding to the minimum response with balance, to the position β which is the nearest to the preceding and corresponds to the minimum response with unbalancing, the direction of rotation of the frame must, for example, always be such that the first half rotation of the coil L′ directly connected with ground approaches the sending station which in Figs. 3ª and 3ᵇ of the drawings is assumed to be at the left of the sheet. This law is easily verified by means of a few signals sent from stations that are known.

The conditions to be obtained in order that the rotation $(Z_2-Z_1)$ of the frame be conclusive are as follows.

A rotation by at least 15 degrees is absolutely necessary for eliminating the errors arising from mediocre observations.

Interpretation of the rotation effected by the frame when passing from the reading $Z_1$ (balance) to the reading $Z_2$ (unbalance).

The voltage Y sin $(\omega t+\gamma)$ must be made as great as possible with respect to the force X sin $Z_2$ sin $(\omega t+\epsilon)$. In other words, the reading $Z_2$ must be made under conditions when the unsymmetry is accentuated.

In the circuits of Figs. 1, 4 and 5, the switches P′, P″ having a common controlling means must be simultaneously moved into position 1 for the reading of the angle $Z_1$ and into the position 2 for the reading of $Z_2$. In position 2 the following unsymmetrical conditions arise:

The balancing condenser $C_1$ is disconnected, whereby the additional potential at b of the open oscillator is increased.

The other terminal of the amplifying and detecting system is connected directly to ground, i. e. to a source of potential.

The potential developed in the whole frame is, if necessary, increased by an auxiliary self induction coil L (Fig. 5) but without causing thereby a dangerous increase of the individual wave.

In order to understand how the rotation effected by the frame when passing from the reading $Z_1$ (balance) to the reading $Z_2$ (unbalance) may be interpreted, let us assume that the apparatus is adjusted for the usual operating conditions; that the movable frame is before a fixed index; and that angular readings increase when the frame is turned in a clock-wise direction.

As shown in Fig. 3ª, when passing from the reading $Z_1$ to the reading $Z_2$, the frame turns in a clockwise direction (increasing angles) when the first half-coil L′ connected to ground is to the left hand of an observer who is assumed to be looking in the direction of the sending station, and in counter clockwise direction (decreasing angles) when the half coil L′ is to the right hand.

In order to obtain from this a simple rule that may be put to practical use, it is advisable that the graduations be established in accordance with a conventional and uniform rule. For instance, the angle indicated by the index must be equal to the real digression for the suppression obtained with a balanced frame, the first half-coil that is most directly connected with ground being to the left hand of the assumed observer. This rule of construction may of course be varied for geographical surveys as well as for digressions with respect to the longitudinal axis of a boat. The rule may be established once for all by observing signals resulting from a known digression. The frame must be balanced, tuned and pointed in a manner to destroy the signal, the directly grounded half-coil being to the left of an operator who is assumed to be looking in the direction of the sending station. The known digression is placed in front of the index on the graduated plate and thus, the zero point of the graduation is determined.

For the observation of actual signals, the following rules are to be observed.

If the two successive readings $Z_1$ and $Z_2$ are such that $Z_2>Z_1$ ($Z_2<Z_1$), the angle $Z_1$ is correct.

If on the other hand, the inequality $Z_2<Z_1$ ($Z_2>Z_1$) was obtained, the reading $Z_1$ must be increased by 180 degrees in order to obtain the true digression.

A simplified arrangement is shown in Fig. 6 for practicing the principle of the method previously described and has certain advantages in the practical application of the method.

It will be noted that the method described is based on the inequality of the electrostatic capacities existing between the terminals of the receiving frame and ground.

According to the present modification, for the purpose of ascertaining the exact digression (the exactness being characterized by two suppressions separated by 180 degrees and by the equality in extent of the two planes of suppression), the symmetry of the frame is obtained in a manner that is imperfect in theory but sufficient in practice, by grounding a point near the centre of the antenna self induction coil. This operation stabilized the potential of the frame and attenuates its effect as an open antenna. The simplified arrangement is arranged in the following manner.

The movable frame 11 forms a closed circuit with the variable condenser 12. By operating a switch 13, ground may be connected to a suitably chosen point (more or less near the centre) of the self induction coil of the frame. The condenser 12 is connected through conductors 14 and 15 to the terminals of the receiving apparatus, diagrammatically illustrated by a three-electrode tube 16, but usually this apparatus comprises a complete amplifying and detecting system. 17 is a battery that supplies current to the receiving apparatus which are e. g. connected through a transformer 18 with the indicating apparatus 19 (telephone, galvanometer, etc.). The installation is completed by a small Faraday cage 20 enclosing all the apparatus and circuits with the well understood exception of the antenna and the indicating apparatus. The conductor leading to the switch 13 is connected with the Faraday frame.

In order to produce the desired unsymmetry necessary for the removal of the doubt, the capacity provided between the Faraday frame and the apparatus (amplifiers, battery, etc.) connected with conductor 14 of the condenser 12 is adjusted. The conductor 15 is connected to a simple grid without appreciable individual capacity. When the switch 13 is open, the natural unsymmetry of the circuits modifies the digression by about fifteen degrees and this angle is sufficient for removing the doubt existing concerning the digressions, the direction of the digression variation being the one described in the main patent.

Having described my invention, what I claim is:

1. A direction finder comprising a loop antenna, a tuning element therein, a detector circuit connected to said tuning element, a ground connection connected to one side of the tuning element containing a capacity adapted to balance the capacity of said detector circuit to ground or its equivalent, a second connection on the other side of the tuning element and a switch for connecting said side to ground to unbalance the capacity of the loop to ground or its equivalent.

2. A direction finder comprising a loop antenna, a tuning element therein, a detector circuit connected to said tuning element, a ground connection connected to one side of the tuning element containing a capacity adapted to balance the capacity of said detector circuit to ground or its equivalent, a second connection on the other side of the tuning element and a switch for connecting said side to ground to unbalance the capacity of the loop to ground or its equivalent and an impedance in said second ground connection.

3. In the method of ascertaining the direction of a transmitting station from a receiving station with a loop antenna functioning at one time as a directional antenna and at another time as a combined directional and non-directional antenna, the steps which comprise, electrically balancing the loop antenna and setting the same as a directional antenna to the point of minimum signal reception, then electrically unbalancing said loop antenna and setting the same as a combined directional and non-directional antenna to the point of minimum signal reception, and determining from the direction of digression between these two points the sense of direction of the transmitting station.

4. In the method of ascertaining the direction of a transmitting station from a receiving station with a loop antenna functioning at one time as a directional antenna and at another time as a combined directional and non-directional antenna, the steps which comprise, electrically balancing the loop antenna and setting the same as a directional antenna to the point of reception of a signal of predetermined strength, then electrically unbalancing said loop antenna and setting the same as a combined directional and non-directional antenna to the point of reception of a signal of said predetermined strength, and determining from the direction of digression between said points the sense of direction of the transmitting station.

HENRI JEAN JOSEPH MARIE de
REGNAULD de BELLESCIZE.